US010720960B2

(12) United States Patent
Kellum et al.

(10) Patent No.: US 10,720,960 B2
(45) Date of Patent: Jul. 21, 2020

(54) SYSTEM AND METHOD OF DIGITAL SIGNAL PROCESSING

(71) Applicant: Raytheon Company, Waltham, MA (US)

(72) Inventors: Theodore Mark Kellum, Canyon Country, CA (US); William D. Phillips, McKinney, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/458,627

(22) Filed: Jul. 1, 2019

(65) Prior Publication Data

US 2020/0145044 A1     May 7, 2020

Related U.S. Application Data

(60) Provisional application No. 62/755,002, filed on Nov. 2, 2018.

(51) Int. Cl.
  *H04B 1/713* (2011.01)
  *H04B 1/10* (2006.01)
  (Continued)

(52) U.S. Cl.
  CPC ......... *H04B 1/7156* (2013.01); *H04B 1/7136* (2013.01); *H04L 5/0007* (2013.01);
  (Continued)

(58) Field of Classification Search
  CPC ............. H04L 27/2017; H04B 1/7143; H04B 2001/7154; H04W 16/14; H04W 74/04; H04W 72/1215
  See application file for complete search history.

(56) References Cited

U.S. PATENT DOCUMENTS 6,067,313 A * 5/2000 Cafarella ............. H04J 13/004
                                                        13/4
7,542,520 B1 * 6/2009 Estrada ............. H04L 25/03834
                                                       332/100
(Continued)

FOREIGN PATENT DOCUMENTS

KR      20170074453 A     6/2017

OTHER PUBLICATIONS

International Search Report and Written Opinion from related PCT Application No. PCT/US2019/059337, dated Feb. 19, 2020.

(Continued)

*Primary Examiner* — Aristocratis Fotakis
(74) *Attorney, Agent, or Firm* — Burns & Levinson, LLP; Joseph M. Maraia

(57) ABSTRACT

A system and method for transmitting a digital signal comprising includes a random number generator for generating a pseudorandom code. A scheduler stores a plurality of signal sequences each matching a set of bandwidth-time products and center frequencies with a stored code. The scheduler selects a signal sequence by matching the pseudorandom code with one of the stored codes. The scheduler selects a bandwidth-time product and center frequency based on the selected signal sequence. A baseband processing unit generates the digital signal based on a selected bandwidth-time product and center frequency. A front end processing and beamforming unit broadcasts the digital signal.

10 Claims, 4 Drawing Sheets

(51) Int. Cl.
*H04B 1/7156* (2011.01)
*H04B 1/7136* (2011.01)
*H04L 9/06* (2006.01)
*H04L 5/00* (2006.01)

(52) U.S. Cl.
CPC ...... *H04L 9/06* (2013.01); *H04B 2001/71367* (2013.01); *H04B 2001/71566* (2013.01); *H04B 2201/70715* (2013.01)

(56) References Cited

U.S. PATENT DOCUMENTS

| | | | |
|---|---|---|---|
| 8,442,016 B1* | 5/2013 | Lee | H04W 72/1215 370/338 |
| 9,755,879 B2 | 9/2017 | Hassan et al. | |
| 2005/0276241 A1* | 12/2005 | Kamerman | H04W 28/06 370/328 |
| 2007/0165754 A1* | 7/2007 | Kiukkonen | H04B 1/715 375/346 |
| 2008/0045152 A1* | 2/2008 | Boes | H04W 16/14 455/63.1 |
| 2008/0273552 A1* | 11/2008 | Kim | H04J 11/0066 370/468 |
| 2009/0257396 A1* | 10/2009 | Eliezer | H04B 1/036 370/330 |
| 2010/0316089 A1* | 12/2010 | Liu | H04B 15/04 375/133 |
| 2010/0322287 A1* | 12/2010 | Truong | H04W 72/1215 375/133 |
| 2011/0038440 A1* | 2/2011 | Balbach | H04J 13/0022 13/22 |
| 2012/0033656 A1* | 2/2012 | De Maaijer | H03F 3/211 370/338 |
| 2017/0054725 A1 | 2/2017 | Manley | |

OTHER PUBLICATIONS

Junqing Zhang et al., "Securing Wireless Communications of the Internet of Things from the Physical Layer, An Overview," Entropy, vol. 19, No. 8, Aug. 18, 2017, pp. 420, XP055661156.

Marwen Bouanen et al., "An LPI Design for Secure OFDM Systems," Military Communications Conference, 2012, MILCOM 2012, IEEE, Oct. 29, 2012, pp. 1-6, XP032315644.

* cited by examiner

SYSTEM AND METHOD OF DIGITAL SIGNAL PROCESSING

CROSS REFERENCE TO RELATED APPLICATIONS

This application claims priority to and the benefit of U.S. Provisional Patent Application No. 62/755,002, filed on Nov. 2, 2018 and titled "SYSTEM AND METHOD OF DIGITAL SIGNAL PROCESSING", the contents of which are incorporated herein by reference as though fully set forth herein.

FIELD OF THE TECHNOLOGY

The subject disclosure relates to object detection and more particularly to sending and receiving digital signals.

BACKGROUND OF THE TECHNOLOGY

RF air interfaces and front-ends (RF waveforms, symbols, frame structures, antenna arrays through to demodulators) are the Achilles tendon of mobile nodes passing through or situated in electronically contested volumes. RF spectrum is flooded with sensor/autonomous systems and communications nodes performing sensitive business transactions, often requiring some level of confidentiality. Due to size, weight, power and complexity constraints many of these nodes will have limited processing capabilities.

Well established frameworks such as low probability of intercept, including spread spectrum techniques, frequency agile systems, will protect against detection and intercept, however processing gain needs to be non-trivial and from an information theoretic perspective these frameworks have low symbol capacity. Additionally, brute force encryption methods such as HAIPE or IPSEC increases latency and decreases useful bit density within packets transmitted. These higher layer techniques do nothing against detection and physical layer denial of service attacks. Traditional RF waveform tunneling technologies are not capable of simultaneously carrying information symbols at different levels of security within the same burst or instantaneous bandwidth while also greatly reducing RF interception of the physical information symbols.

SUMMARY

In light of the needs described above, the subject technology provides a system and method of digital signal processing that produces a secure signal while also being spectrally efficient.

In at least one aspect, the subject technology relates to a system for transmitting a digital signal including a random number generator configured to generate a pseudorandom code. A scheduler is configured to store a plurality of signal sequences each matching a set of bandwidth-time products and center frequencies with a stored code. The scheduler is configured to select a signal sequence by matching the pseudorandom code with one of the stored codes. The scheduler is configured to select a bandwidth-time product and center frequency based on the selected signal sequence. A baseband processing unit is configured to generate the digital signal based on a selected bandwidth-time product and center frequency. A front end processing and beamforming unit is configured to broadcast the digital signal.

In some embodiments, the signal sequences include, for each stored code: a bandwidth-time product and center frequency for a Bluetooth waveform; and a bandwidth-time product and center frequency for an OFDM waveform. The scheduler can be configured to select, based on the selected signal sequence, a bandwidth-time product and center frequency for the Bluetooth waveform and a bandwidth-time product and center frequency for the OFDM waveform. The baseband processing unit can be configured to simultaneously combine the Bluetooth waveform and the OFDM waveform to generate the digital signal. In some embodiments, the digital signal is further configured to resemble a commercial Bluetooth waveform. The baseband processing unit can be configured to generate a second digital signal by modifying the selected bandwidth-time product and center frequency based on a desired level of security. The front end processing and beamforming unit is can be configured to broadcast the second digital signal.

In some embodiments, the system includes a receiver. The receiver is configured to generate the pseudorandom code and store the signal sequences to predict the bandwidth-time product and center frequency of the digital signal. The receiver then decodes the digital signal based on the bandwidth-time product and center frequency of the digital signal.

In at least one aspect, the subject technology relates to a method of transmitting a digital signal. The method includes generating, by a random number generator, a pseudorandom code. A scheduler stores a plurality of signal sequences each matching a set of bandwidth-time products and center frequencies with a stored code. The scheduler selects a signal sequence by matching a pseudorandom code with one of the stored codes. The scheduler selects a bandwidth-time product and center frequency based on the selected signal sequence. A baseband processing unit generates the digital signal based on the selected bandwidth-time product. A front end processing and beamforming unit broadcasts the digital signal.

In some embodiments, the signal sequences include, for each stored code: a bandwidth-time product and center frequency for a Bluetooth waveform; and a bandwidth-time product and center frequency for an OFDM waveform. The scheduler can then select, based on the selected signal sequence, a bandwidth-time product and center frequency for the Bluetooth waveform and a bandwidth-time product and center frequency for the OFDM waveform. The baseband processing unit can then simultaneously combine the Bluetooth waveform and the OFDM waveform to generate the digital signal. In some embodiments, the digital signal is further configured to resemble a commercial Bluetooth waveform. In some embodiments, the baseband processing unit generates a second digital signal by modifying the selected bandwidth-time product and center frequency based on a desired level of security. The front end processing and beamforming unit can then broadcast the second digital signal.

In some embodiments, the method includes generating, at a receiver, the pseudorandom code. The signal sequences are stored at the receiver. The receiver predicts the bandwidth-time product and center frequency of the digital signal. The receiver receives the digital signal. The receiver then decodes the digital signal based on the predicted bandwidth-time product.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

Figure 1:
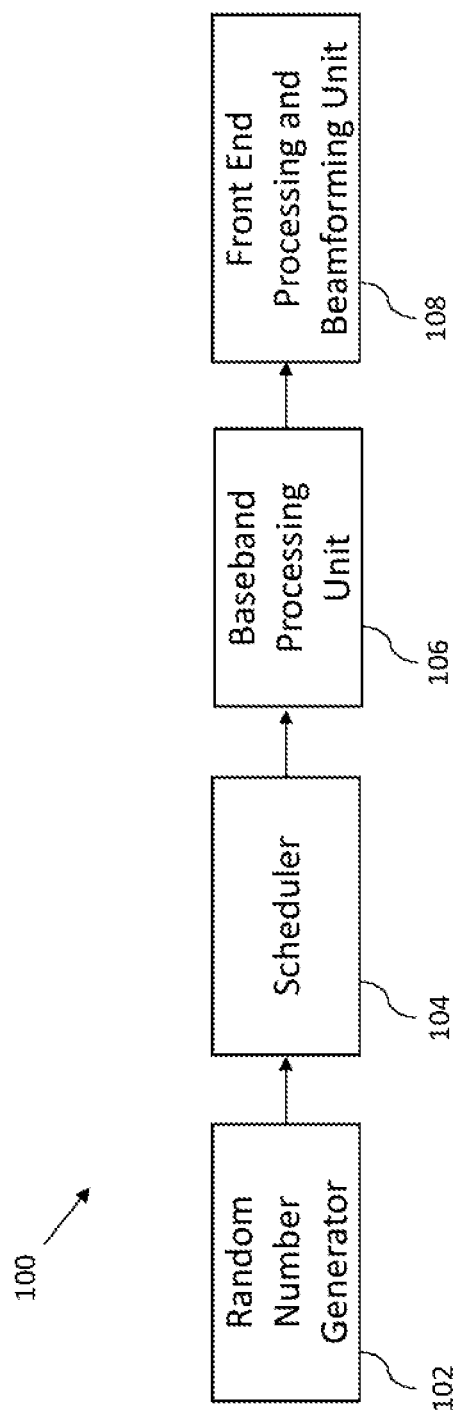
FIG. 1 is a block diagram of a system for transmitting a digital signal in accordance with the subject technology.

The subject technology overcomes many of the prior art problems associated with transmitting a secure digital signal. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be on top).

Referring now to FIG. 1, a block diagram of a system 100 for transmitting a digital signal in accordance with the subject technology is shown. The system 100 in includes a random number generator 102, a scheduler 104, baseband processing unit 106, and a front end processing and beamforming unit 108.

The random number generator 102 is configured to generate a pseudorandom code used by the system 100. The random number generator 102 can be a processor configured to generate the pseudorandom code sequence using computational algorithms as are known in the art. For higher precision and hence greater resiliency against intercept, the processor will be aided by internal GPS precision time. The clock determines the sequenced internal state machine (S, i), i=1, N, which controls the step by step march through the predetermined waveforms. The (S, i) waveform satisfies the bandwidth time product associated with the particular ith number in the pseudo-random sequence. Once a particular pseudorandom code is generated, the scheduler 104 takes action based on the generated pseudorandom code sequence. The scheduler 104 has processing capabilities and memory for data storage. In particular, several sets of pseudo random code sequences, equivalently states or waveforms, e.g. (S, i) and (S, j), may be stored in scheduler memory and then used when channel conditions require more diversity. Notably, the scheduler 104 need not be a single device, and can be comprised of one or more individual devices configured to carry out the functions described herein. The scheduler 104 stores a number of signal sequences. The signal sequences, or waveforms with specified bandwidth time products and center frequencies determined by the (S, i), are each matched with a code sequence corresponding to the various pseudorandom codes that can be generated by the random number generator 102. The scheduler 104 can identify a set of signal sequences based on a match between the generated pseudorandom code with a stored code. The set can include several bandwidth time-products and center frequencies for signals depending on the desired signal type (e.g. a particular signal sequence set can include one bandwidth-time product and center frequency for a Bluetooth signal and another bandwidth-time product and center frequency for an OFDM signal). The scheduler 104 can then select a bandwidth-time product and center frequency for a signal based on the determined signal sequence and channel conditions. Bandwidth-time product is a product of the temporal duration and spectral width of the signal pulse. The baseband processing unit 106 then processes the signal as needed. This can include using pulse shaping filters to change the signal, shaping based on the selected bandwidth-time product. This can be done for a single signal, or for multiple signals which are then combined. Further processing can then occur in the front end processing and beamforming unit 108. The front end processing and beamforming unit 108 combines signals as necessary for transmission and then broadcasts a signal so it can be picked up by one or more receiver systems.

Notably, while the system 100 is an exemplary system for transmitting a signal, it should be understood that one or more corresponding receiver systems can also be used to receive and process the transmitted signal. To do so the receiver system can include information about what pseudorandom code will be generated by the random number generator 102. For example, the receiver system can include the algorithm used by the random number generator 102, so that the receiver system knows what pseudorandom code will be selected. Similarly, the receiver system can have knowledge of the signal sequences so that it can predict what bandwidth-time product will be selected by the system 100. In this way, the receiver systems are able to meaningfully decode the transmitted digital signal.

Figure 2:
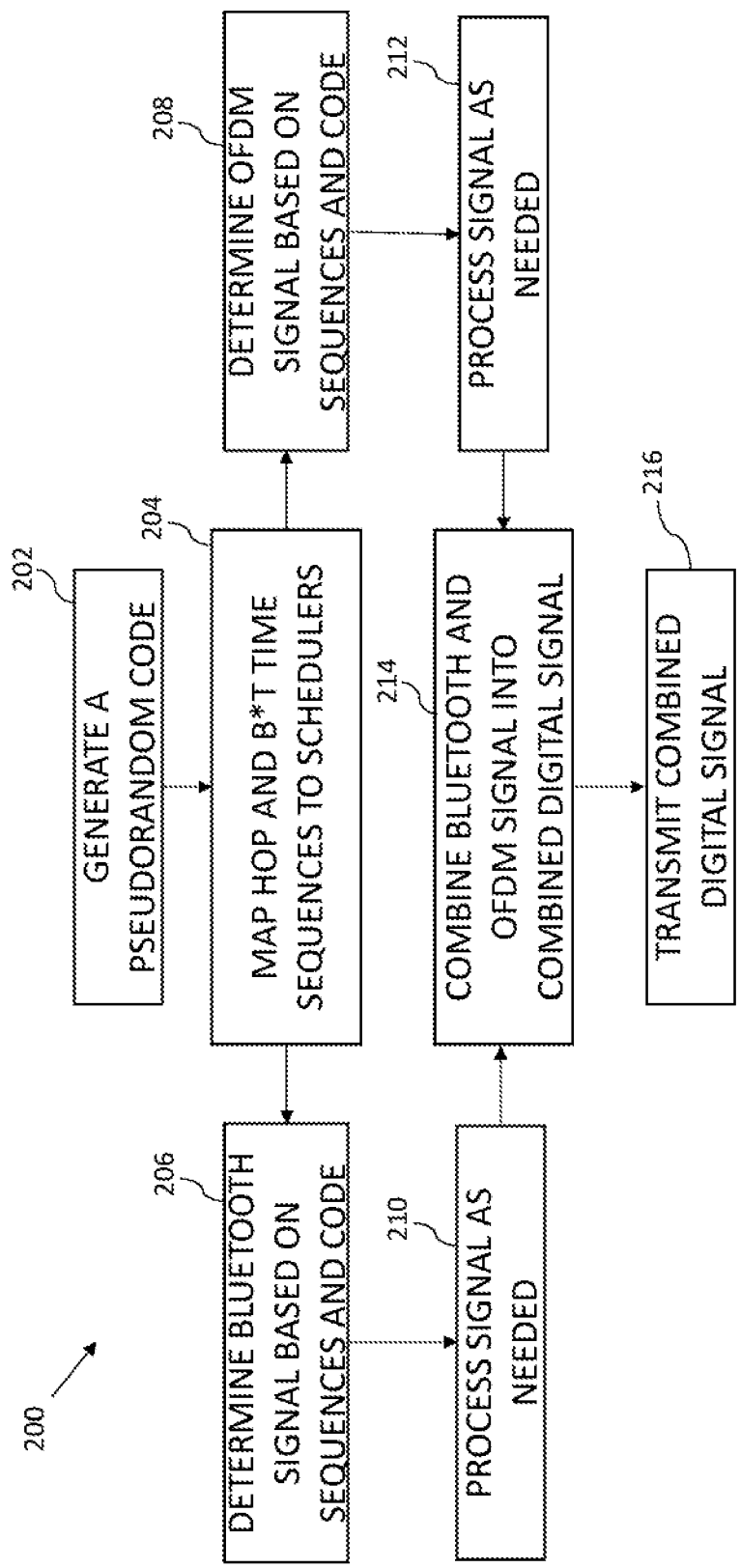
FIG. 2 is a flow diagram of a method for transmitting a digital signal in accordance with the subject technology.

Referring now to FIG. 2, a flow diagram 200 of a method for transmitting a digital signal in accordance with the subject technology is shown. The method shown in flow diagram 200 can be carried out utilizing a system including similar components to those shown and discussed with respect to the other systems described herein, such as the system 100. In the diagram 200, the transmitted digital signal is formed by combining two separate signals, including a Bluetooth signal and an OFDM signal. While combining a Bluetooth signal and an OFDM signal has been found to be advantageous, it should be understood that in different embodiments different types of signals and different numbers of signals could also be combined in accordance with the other teachings herein. For example, other Gaussian filtered data links can be used. Flow diagram 200 is provided only by way of example.

The flow diagram 200 starts, at step 202, with the generation of a pseudorandom code 202. At step 204, signal sequences are loaded to respective schedulers for the Bluetooth signal and for the OFDM signal. As discussed above, the signal sequences associate particular codes generated by the pseudorandom code generator with bandwidth-time products for the signal. In this case, the bandwidth-time product that will be selected for the Bluetooth signal and the bandwidth-time product that will be selected for the OFDM signal will be different. Particular center frequencies are also associated with each signal sequence, for both the Bluetooth signal and the OFDM signal. Notably, pulses from the Bluetooth signal and the OFDM signal need to avoid interference with one another. Therefore, the bandwidth-time products and center frequencies associated with a particular code for the Bluetooth and OFDM signals are correlated to one another to minimize interference between the respective pulses for the Bluetooth and OFDM signals, as discussed in more detail below. At step 204, the scheduler gathers information on the set amount of bytes that will need to be modulated onto the separate waveforms for the Bluetooth and OFDM signals. This information can be used to avoid interference.

At step 206, a Bluetooth signal with a particular bandwidth-time product and center frequency is determined, from the schedule of signal sequences, based on the generated pseudorandom code. Relatedly, at step 208, an OFDM signal with a particular bandwidth-time product and center frequency is determined, from the schedule of signal sequences, based on the generated pseudorandom code. As mentioned above, the selected Bluetooth signal and OFDM are correlated based on the information within the scheduler at step 204 such that the signals determined at step 206 and 208 do not interfere.

Additional processing can then optionally be applied, as needed, to the Bluetooth signal at step 210 and to the OFDM signal at step 212. The processing can include downconversion, upconversion, filtering, amplification, or other typical signal processing, as is known in the art. After processing the Bluetooth signal and the OFDM signal 208 are simultaneously added to form a single digital signal at step 214. At step 216, the digital signal is broadcast by a transmitter where it can then be received by a receiving system. In some cases, the final digital signal can also be shaped to resemble a commercial Bluetooth waveform. This is accomplished by placing the OFDM signal as close as possible to the Bluetooth waveform without getting interference. Doing so can add additional security by making the transmitted digital signal very hard to pick out from other Bluetooth transmissions in a crowded signal space, such as a heavily populated urban area.

Figure 3B:
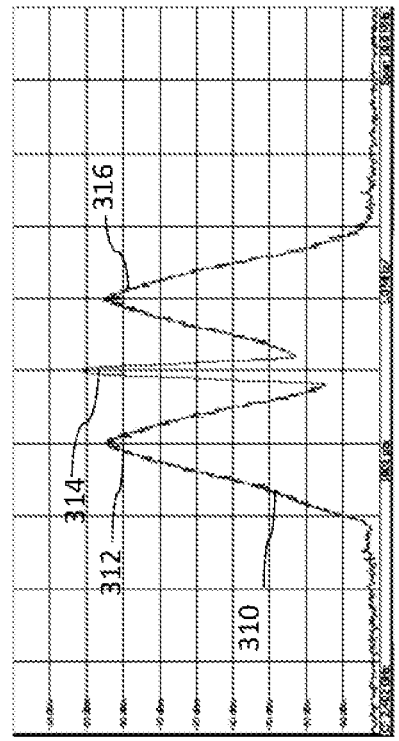
FIG. 3B is a representative signal trace diagram of a combined Bluetooth and OFDM signal in accordance with the subject technology.
Figure 3A:
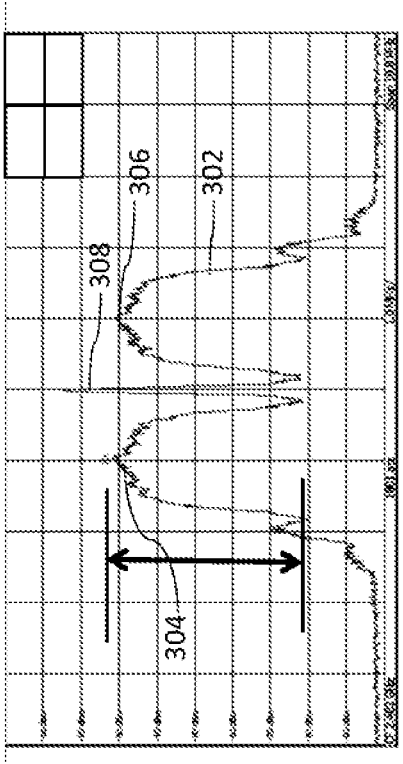
FIG. 3A is a representative signal trace diagram of a combined Bluetooth and orthogonal frequency-division multiplexing (OFDM) signal.

Referring now to FIGS. 3A-3B, graphs 300a, 300b of a digital signal are shown. More particularly, FIG. 3A shows a graph 300a of a combined Bluetooth and OFDM signal represented by graph line 302. A Gaussian Frequency Shift Keying (FSK) Bluetooth signal 308 is multiplexed with a narrowband OFDM signal 304 and 306. The combined Bluetooth/OFDM signal pulses 304, 306, 308 are a hopping waveform based on pseudorandom code. Since the transmitting system knows the current pseudorandom code, the system also knows the location of the Bluetooth signal pulse 308. The OFDM pulses 304, 306 can therefore be moved to avoid the areas of maximum interference of the Bluetooth signal pulses. As such, the graph 300a shows the Bluetooth pulse 308 positioned to minimize interference with respect to the OFDM signal pulses 304, 306.

In FIG. 3A, the Bluetooth pulses 304, 306 tend to have a typical pulse shaping filter distribution, such as a Gaussian filter. In FIG. 3B, the filter is adaptively changed via pseudorandom codes to improve security and lower the likelihood of detection as shown on graph 300b. On graph 300b, the digital signal is represented by graph line 310. To generate the digital signal represented by graph line 310, a bandwidth-time product for the signal is selected based on the pseudorandom code. In this way, the pseudorandom code dictates how to adaptively change the filter of the system for each pulse period based on the selected bandwidth-time product for the signal. The resulting Bluetooth pulses 312, 316 and OFDM pulse 314 of the digital signal 310 are very hard to predict for an outside entity receiving the signal and therefore very hard to decode.

In particular, to decode the digital signal of the subject technology, the outside entity must detect a signal against background noise and determine the signal type to demodulate including both the pseudorandom code and the schedule of signal sequences containing the relationship between pseudorandom codes and the bandwidth-time product selected. The pulse bandwidth of the subject application is dictated by pulse shaping filters which are changing due to the pseudorandom code. This makes it much harder to decode the signal, as compared to a signal that simply has a pulse bandwidth dictated by pulse shaping filters based on the pseudorandom code. Every device (e.g. transmitter and receiver) which is part of this system is tuned to the same pseudorandom code generation scheme with a prior understanding of what bandwidth-time period and center frequency is being used. Therefore while friendly receivers are able to tune into the system, unwanted listeners would not have the capability to tune in. There is also increased security from this approach because the pulse shaping filters are dynamically changing, for example, every 600 to 700 microseconds. This has the effect of shifting the signal peaks along the x-axis of the graph, and potentially causing the signal to look different to an outside listener the next time it appears.

In some applications, the subject technology can also provide for multiple independent levels of security (MILS). Each signal can have a modified bandwidth time product based on a desired level of security. For example, Bluetooth waveforms are a standardized signal. When numerous signals are sent out, certain signals can be modified with Bandwidth-time products and center frequencies that most closely resembled a standard Bluetooth waveform. Signals that look more similar to the Bluetooth waveform will be more easily missed by an unwanted listener trying to decode the signal, and therefore are safer for sending out highly confidential information. Therefore certain Bandwidth-time products and center frequencies can be utilized when a higher level of security is required, limiting the access of third parties to highly confidential information.

In certain applications, the signal of subject technology is also very hard to even observe. For example, the subject technology can operate over Bluetooth in an urban environment. Bluetooth signals can operate below the noise floor, making it difficult to detect. Further, Bluetooth signals are widely used commercially and are ubiquitous in an urban environment, making it very difficult to distinguish the signal of the subject technology from many other signals and/or noise detected.

Figure 4A:
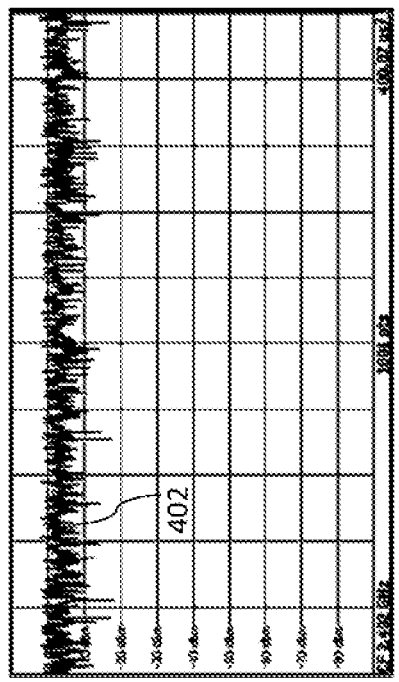
FIG. 4A is a representative signal trace diagram of a Bluetooth signal in accordance with the subject technology.
Figure 4B:
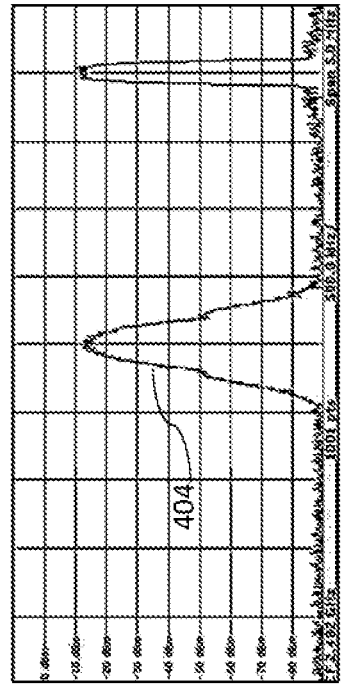
FIG. 4B is a representative signal trace diagram of an OFDM signal in accordance with the subject technology.

Referring now to FIGS. 4A-4B, graphs of two signals 402, 404 which can be modified and combined in accordance with the subject technology are shown. The graph 400a shows a typical Bluetooth signal 402 while the graph 400b shows a filtered OFDM pulse 404. For the exemplary signal, a bandwidth-time product of 0.2 was selected for the filtered OFDM 16 QAM 100 MHz pulse 404. The signals can be shaped individually and separately, for example, as shown and described in flow diagram 200. Eventually, the Bluetooth signal 402 and the OFDM pulse 404 can be combined, such as by baseband processing unit 106. The combined digital signal can then be transmitted.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements (e.g. transmitters, receivers, and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A system for transmitting a digital signal comprising:
a random number generator configured to generate a pseudorandom code;
a scheduler configured to: store a plurality of signal sequences each matching a set of bandwidth-time products and center frequencies with a stored code; select a signal sequence by matching the pseudorandom code with one of the stored codes; and select a bandwidth-time product and center frequency based on the selected signal sequence;
a baseband processing unit configured to generate the digital signal based on a selected bandwidth-time product and center frequency; and
a front end processing and beamforming unit configured to broadcast the digital signal.

2. The system of claim 1, further comprising:
the signal sequences include, for each stored code: a bandwidth-time product and center frequency for a Bluetooth waveform; and a bandwidth-time product and center frequency for an OFDM waveform;
the scheduler is configured to select, based on the selected signal sequence, a bandwidth-time product and center frequency for the Bluetooth waveform and a bandwidth-time product and center frequency for the OFDM waveform; and
the baseband processing unit is configured to simultaneously combine the Bluetooth waveform and the OFDM waveform to generate the digital signal.

3. The system of claim 2, wherein the digital signal is further configured to resemble a commercial Bluetooth waveform.

4. The system of claim 1, wherein:
the baseband processing unit is configured to generate a second digital signal by modifying the selected bandwidth-time product and center frequency based on a desired level of security; and
the front end processing and beamforming unit is configured to broadcast the second digital signal.

5. The system of claim 1, further comprising at least one receiver configured to:
generate the pseudorandom code and store the signal sequences to predict the bandwidth-time product and center frequency of the digital signal; and
decode the digital signal based on the bandwidth-time product and center frequency of the digital signal.

6. A method of transmitting a digital signal comprising:
generating, by a random number generator, a pseudorandom code;
storing, by a scheduler, a plurality of signal sequences each matching a set of bandwidth-time products and center frequencies with a stored code;
selecting, by the scheduler, a signal sequence by matching a pseudorandom code with one of the stored codes;
selecting, by the scheduler, a bandwidth-time product and center frequency based on the selected signal sequence;
generating, by a baseband processing unit, the digital signal based on the selected bandwidth-time product; and
broadcasting, by a front end processing and beamforming unit, the digital signal.

7. The method of claim 6, wherein:
the signal sequences include, for each stored code: a bandwidth-time product and center frequency for a Bluetooth waveform; and a bandwidth-time product and center frequency for an OFDM waveform;
the scheduler selects, based on the selected signal sequence, a bandwidth-time product and center frequency for the Bluetooth waveform and a bandwidth-time product and center frequency for the OFDM waveform; and
the baseband processing unit simultaneously combines the Bluetooth waveform and the OFDM waveform to generate the digital signal.

8. The method of claim 7, wherein the digital signal is further configured to resemble a commercial Bluetooth waveform.

9. The method of claim 6, further comprising:
generating, by the baseband processing unit, a second digital signal by modifying the selected bandwidth-time product and center frequency based on a desired level of security and;
broadcasting, by the front end processing and beamforming unit, the second digital signal.

10. The method of claim 6, further comprising:
generating, at a receiver, the pseudorandom code;
storing, at the receiver, the signal sequences;
predicting, by the receiver, the bandwidth-time product and center frequency of the digital signal;
receiving, by the receiver, the digital signal; and
decoding, by the receiver, the digital signal based on the predicted bandwidth-time product.

* * * * *